FREIGHT BRACING APPARATUS

Original Filed March 20, 1963 3 Sheets-Sheet 1

INVENTOR
Robert E. Heard
BY
Harness, Dickey & Pierce
ATTORNEYS.

FREIGHT BRACING APPARATUS

Original Filed March 20, 1963 3 Sheets-Sheet 2

INVENTOR.
Robert E. Heard.
BY
Barnes, Dickey & Pierce
ATTORNEYS.

FREIGHT BRACING APPARATUS

Original Filed March 20, 1963 3 Sheets-Sheet 3

INVENTOR.
Robert E. Heard
BY
Carness, Dickey & Pierce
ATTORNEYS.

United States Patent Office

Re. 26,309
Reissued Nov. 28, 1967

26,309
FREIGHT BRACING APPARATUS

Robert E. Heard, Plymouth, Mich., assignor to Evans Products Company, Plymouth, Mich., a corporation of Delaware Original No. 3,151,571, dated Oct. 6, 1964, Ser. No. 266,663, Mar. 20, 1963. Application for reissue Aug. 25, 1965, Ser. No. 485,146
17 Claims. (Cl. 105—369)

**Matter enclosed in heavy brackets [ ] appears in the original patent but forms no part of this reissue specification; *matter printed in italics indicates the additions* made by reissue.**

The present invention relates to freight bracing apparatus and more particularly to freight bracing apparatus of the type including belt rails adapted to be secured in position along the side walls of truck bodies, railway boxcars, and the like, and cross members provided with end fittings extending between and connected to and supported on the belt rails.

It is an object of the present invention to provide an improved freight bracing apparatus of the above mentioned type which is simple in design, economical of manufacture and rugged, reliable and efficient in operation.

Another object of the present invention is to provide an improved apparatus of the above mentioned type including an improved crossbar end fitting and an improved belt rail structure permitting a novel and highly desirable co-operation therebetween.

It is also an object of the present invention to provide an improved freight bracing apparatus of the above mentioned type in which crossbars may be readily installed by a single workman who may effect a preliminary engagement of one end fitting with one of the belt rails and then slide that end fitting along the belt rail to the position in which its connection to the belt rail is to be completed, and in which completion of the connection is automatically effected as the workman moves the bar to connect the end fitting at the opposite end thereof to another belt rail.

Other and more detailed object of the present invention will be apparent to those skilled in the art from a consideration of the following specification, the appended claims, and the accompanying drawings wherein:

Figure 1:
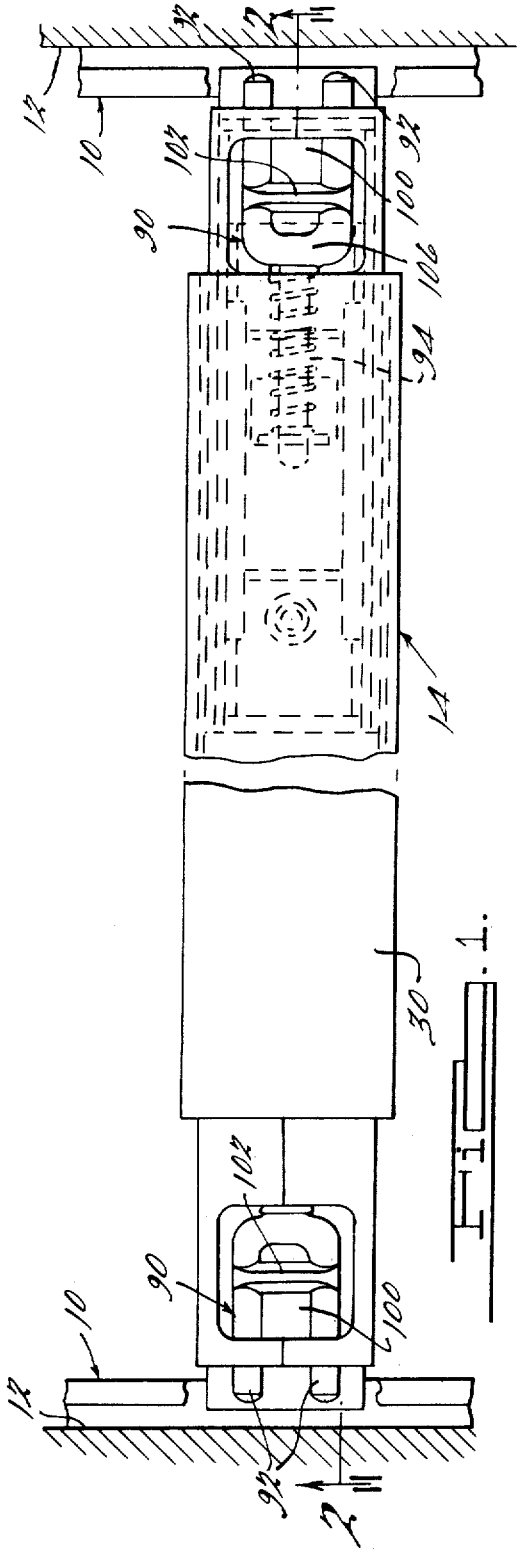
FIGURE 1 is a broken plan view of the freight bracing apparatus constructed according to a preferred form of the present invention.
Figure 2:
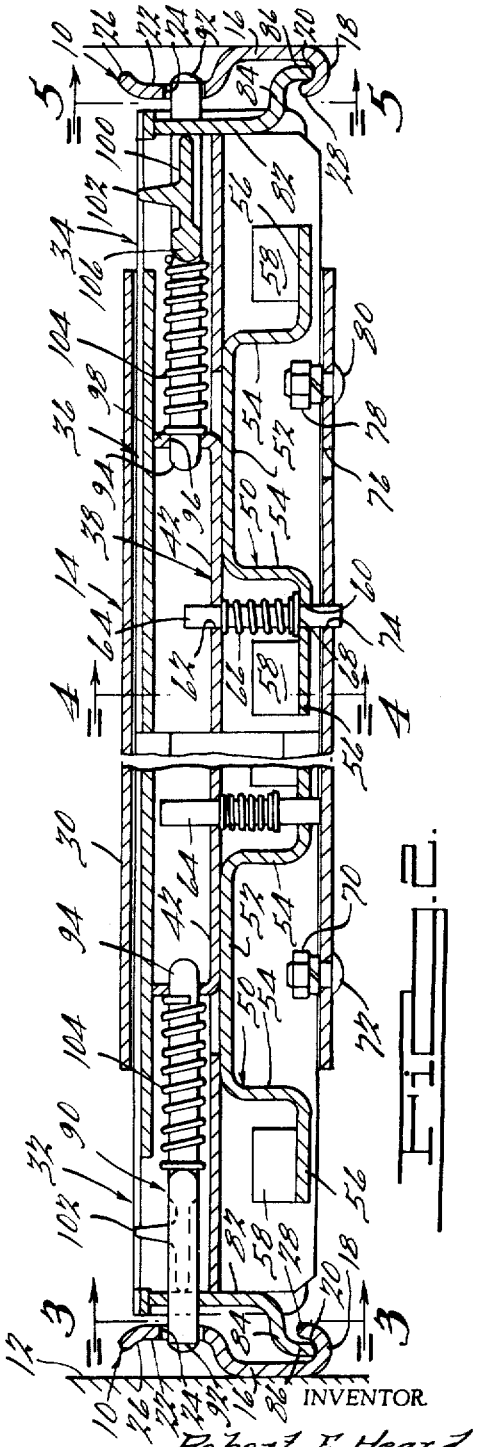
FIGURE 2 is a broken sectional view of the structure illustrated in FIGURE 1 taken substantially along the line 2—2 thereof.
Figure 3:
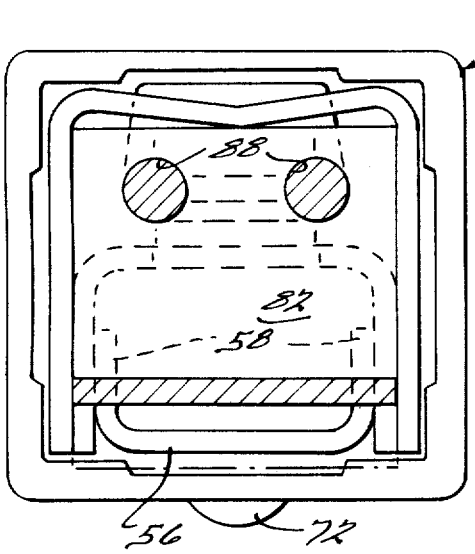
Figure 4:
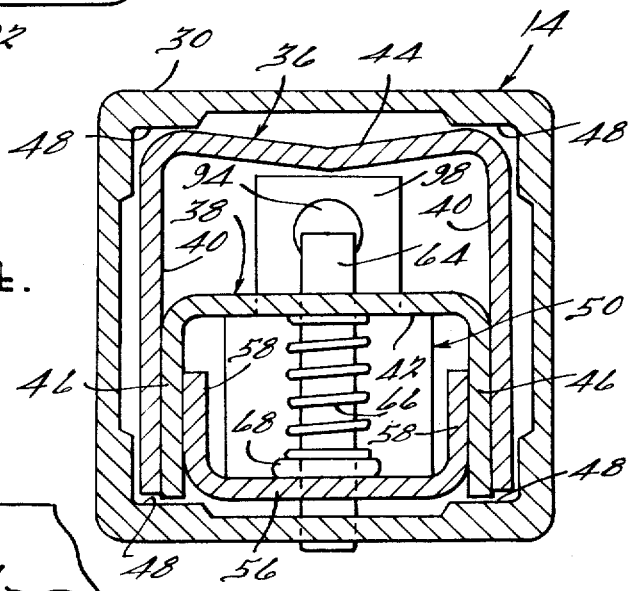
Figure 5:
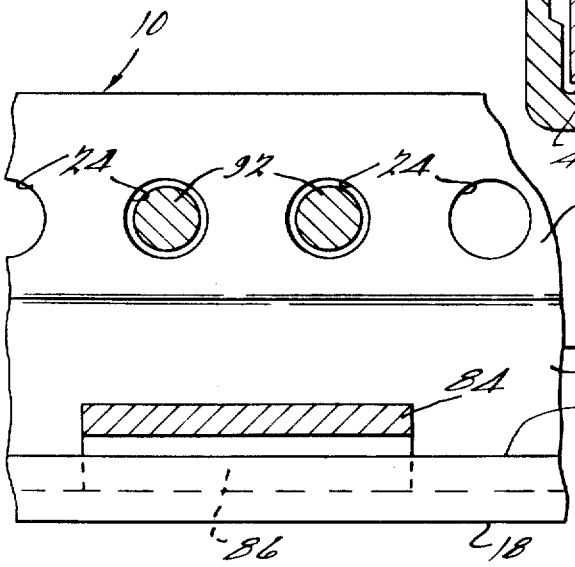
Figure 6:
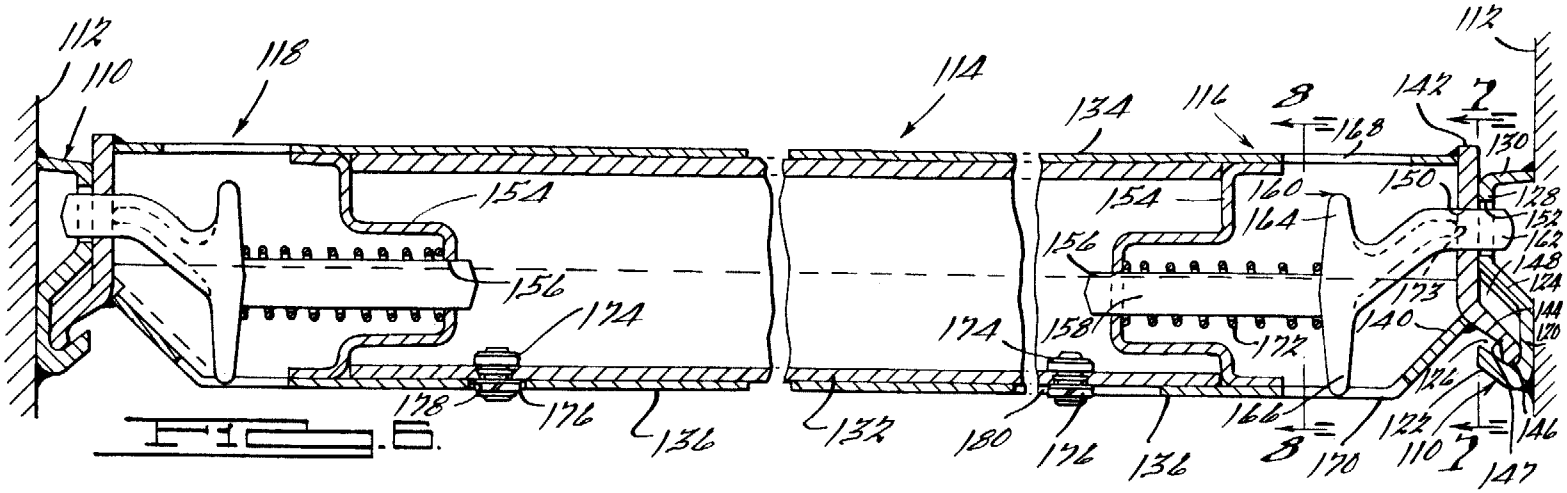
Figure 5:
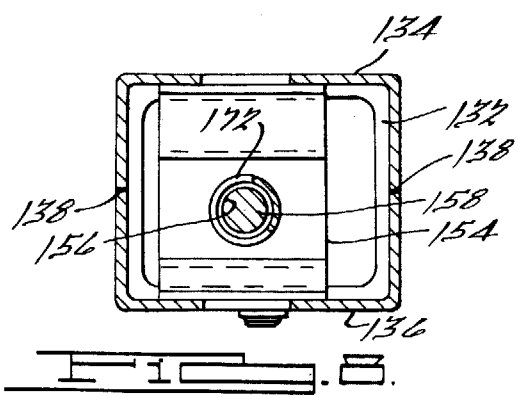
Figure 7:
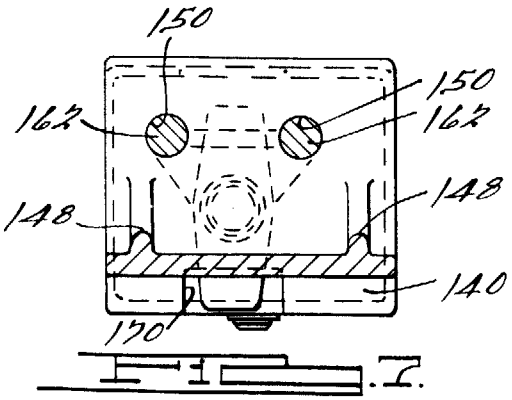

FIGURES 3, 4 and 5 are enlarged sectional views of the structure illustrated in FIGURE 2 taken substantially along the lines 3—3, 4—4 and 5—5 thereof, respectively;

FIGURE 6 is a broken longitudinal sectional view similar to FIGURE 2 showing freight bracing apparatus constructed according to a modified form of the present invention; and, FIGURES 7 and 8 are transverse sectional views of the structure illustrated in FIGURE 6 taken substantially along the lines 7—7 and 8—8 thereof, respectively.

Referring to the drawings, and particularly to FIGURES 1 through 5, inclusive, the freight bracing apparatus there illustrated is particularly adapted for use in bracing freight in trucks or other installations where the freight bracing apparatus is subjected to lighter loads and impacts than is the case with freight bracing apparatus employed in railway boxcars. The freight bracing apparatus there illustrated generally comprises a pair of belt rails 10 adapted to be welded or otherwise suitably secured to the side walls diagrammatically represented at 12 of a truck body or the like, and a crossbar generally indicated at 14 extending between and connected to and supported on the belt rails 10. The belt rails 10 may be formed of sheet metal or of extruded aluminum, or as in the preferred embodiment illustrated, may be a rolled steel section.

As is best illustrated in FIGURE 2, the belt rail 10 is of generally S-shaped cross section and the lower portion thereof includes a generally flat vertically extending section 16 adapted to extend along and be welded or otherwise suitably secured to the side wall 12. This lower portion of the belt rail terminates in an upwardly opening U-section 18 integral with the vertical section 16 which provides a groove 20 which extends longitudinally of the belt rail and opens upwardly. The belt rail has an upper vertically extending portion 22 which extends in spaced parallel relation to the side wall 12 and is provided with a plurality of horizontally opening apertures 24 spaced uniformly therealong. The belt rail terminates at its upper edge in a raterally turned edge portion 26 which provides added structural strength to the belt rail. The U-shaped portion 18 at the bottom of the belt rail terminates in an upwardly turned flange portion 28 which is disposed substantially in the plane of the apertured upper belt rail portion 22, but in spaced relation therebelow to permit access to the groove 20 defined by the U-shaped portion 18.

The crossbar 14 comprises an elongated body 30 which, in the preferred embodiment illustrated, is generally square in cross section and formed as an aluminum extrusion. At its opposite ends the crossbar body 30 is provided with end fittings generally indicated at 32 and 34 which serve to connect the crossbar body to the belt rails. In the preferred embodiment illustrated, the end fittings 32 and 34 are identical and accordingly, the same numbers will be used on corresponding parts of the two end fittings. The end fittings in the preferred embodiment illustrated include elongated body portions formed of interfitting sheet metal channels 36 and 38. As best illustrated in FIGURES 3 and 4, the channels 36 and 38 both open downwardly with the channel 38 received between the legs 40 of the channel 36, with the web portion 42 of the channel 38 extending generally parallel to the web portion 44 of the channel 36 and spaced approximately midway from the web 44 to the lower end of the legs 40. The legs 46 of the inner channel 38 are welded to the legs 40 of the outer channel 36. The extruded bar body 30 is formed as best illustrated in FIGURES 3 and 4 with angularly shaped bearing portions 48 integrally formed at each of the interior corners thereof to engage and support the end fitting in the bar body 30.

A sheet metal stiffener element 50 is received between the depending legs 46 of the inner channel 38. This stiffener element 50 extends longitudinally of the end fitting as best illustrated in FIGURE 2 and is generally channel-shaped with a web portion 52 extending along and welded to the inner surface of the web 42 of the inner channel 38 and has leg portions 54 thereof outwardly turned as indicated at 56 to extend along the end fittings. These outer end portions 56 are themselves channel-shaped as best illustrated in FIGURES 3 and 4 and have their upwardly turned leg portions 58 extending along and welded to the inner surface of the depending legs 46 of the inner channel 38. At the end of the stiffener element 50 adjacent the inner end of the end fitting and intermediate the legs 58 and the legs 54, the outwardly turned portion 56 has an aperture 60 which is aligned with a co-operating aperture 62 formed above it in the web 42 of the channel element 38. These apertures co-operate to support a vertical pin 64 which extends therethrough and is urged downwardly by a spring 66 surrounding the pin 64, the upper end of the spring 66 abutting against the lower surface of the web portion 42 of the channel 38 and the lower end of the spring acting against a washer 68 fixed on the pin 64. In the preferred embodiment illustrated, one of the end fittings, namely, the end fitting 32, is freely slidable longitudinally of the crossbar body 30 between limits determined by a stop nut 70 mounted on a stud 72 mounted on the crossbar body 30 and extending inwardly thereof between the spaced legs 54 of the stiffener element 50. The other end fitting 34 is held against movement longitudinally of the bar body 30 by the locating pin 64, the lower end of which extends downwardly through a locating aperture 74 formed in the wall of the crossbar body 30. In the preferred embodiment illustrated a second locating aperture 76 is provided in the crossbar body 30 in spaced relation to the aperture 74 to enable the end fitting 34 to be moved outwardly from the position illustrated in FIGURE 2 to a position in which the pin 64 will be received in the aperture 76, thus providing an adjustment for the over-all length of the bar to permit the bar to be used between differently spaced side walls. A stop nut 78 mounted on a stud 80, similar to the stop 70, prevents inadvertent withdrawal of the end fitting 34 from the crossbar body 30 during movement of the end fitting between the fixed positions provided by the engagement of the pin 64 in the apertures 74 and 76. The vertically disposed pin 64 of the end fitting 32 performs no function and is present only because the end fittings 34 and 36 are identical, thus providing important economies in their manufacture and in the assembly of the end fittings with the crossbar body. During the sliding movement of the end fitting 32 longitudinally of the crossbar body 30 within the limits provided by the engagement of the stop 70 with the legs 54 of the channel-shaped stiffener element 50, the lower end of the pin 64 of the end fitting 32 rides on and slides along the inner surface of the crossbar body 30.

At the outer end of each end fitting the larger channel 36 extends slightly beyond the end of the inner channel 38 and a sheet metal face plate 82 extends transversely of the end fitting between and is welded to the legs 40 of the larger channel element 36 and is disposed against the outer end of the inner channel element 38 as best illustrated in FIGURE 2. The lower portion of the face plate 82 is bent outwardly away from the channel 38 to provide a generally horizontal portion 84 and terminates in a downwardly turned foot portion 86 adapted to hook over the upwardly extending flange 28 of the belt rail 10 and extend into the groove 20 formed on the belt rail 10 to support the end fitting on the belt rail. The upper portion of the fixed plate 82 is provided with a pair of apertures 88 adapted to be aligned with two of the apertures 24 of the belt rail 10 when the face plate foot 86 is in supporting engagement with the U-shaped portion 18 of the belt rail 10 in the groove 20 and the end fitting extends at right angles to the adjacent side wall 12.

A latch pin assembly 90 is mounted in the end fitting between the webs 44 and 42 of the channels 36 and 38, respectively, and includes a pair of parallel latch pins 92 extending through the apertures 88 of the face plate 82 and adapted to extend into the apertures 24 of the belt rail 10. In the preferred embodiment illustrated the latch assembly 90 is a forging which resembles a two-tined fork, the two tines being the latch pins 92 and the portion corresponding to the handle of the fork is a shank 94 which extends inwardly of and longitudinally of the end fitting and has its inner end slidably supported in an aperture 96 provided in an upwardly turned tab portion 92 of the web 42 of the inner channel 38. The latch assembly 90 is provided with a generally flat web portion 100 extending between and interconnecting the pins 92 and which has an upwardly extending handle portion 102 adapted to be engaged by a workman for moving the latch assembly 90. The web portion 100 engages the inner surface of the face plate 82 to prevent movement of the latch assembly beyond the extended position illustrated by a coil spring 104 surrounding the shank 94 between the upwardly turned tab 90 and the transverse latch portion 106 interconnecting the inner ends of the pins 92.

The above described construction lends itself to operation by a single worker who need only manually operate the latch mechanism 90 of one of the end fittings during either installation or removal of the crossbar 14. For example, when it is desired to install the crossbar 14, the fixed end fitting 34 is first moved to the position of the locating pin 64 in the one of the holes 74 and 76 which will provide the proper length for the crossbar. The worker may then move the bar so as to hook the foot portion 86 of either of the end fittings, but preferably of the fixed end fitting 34, over the upwardly extending flange portion 28 of the belt rail 10, while the crossbar 14 is disposed extending downwardly at an acute angle to the wall, rather than in the right angle position illustrated in the drawings. With the crossbar extending downwardly in this manner, the pins 92 while in their extended position will not be in engagement with the belt rail 10 and the crossbar may be slid along the belt rail to the desired position of installation. The workman then raises the opposite or left-hand end of the crossbar as viewed in FIGURE 2, and telescopes the end fitting 32 inwardly to prevent interference with the belt rail 10. As the crossbar 14 is raised to the horizontal position, it will be seen that the pins 92 of the end fitting 34 at the right-hand end of the crossbar, may automatically move into the holes 24 of the belt rail. If the pins 92 happen to fall between the holes 24 of the belt rail, the latch assembly 90 will be pushed to the retracted position against the action of the spring 104, and upon a slight movement of the crossbar along the belt rail, upon alignment of the pins 92 with the belt rail holes 24, the spring 104 will cause the latch assembly to snap into the latched position with the pins 92 extending into the belt rail apertures 24 as illustrated. The workman, in attaching the end fitting 32 at the left-hand end of the crossbar to its associated belt rail 10, engages the handle 102 to retract the latch assembly 90 and the pins 92 thereof, and upon raising the end fitting sufficiently to allow the foot portion 86 of the face plate 82 to pass over the upwardly turned flange 28 of the belt rail, the end fitting 32 is then telescoped outwardly relative to the bar body 30 and the end fitting is moved downwardly to engage the face plate foot 86 in the belt rail groove 20, as illustrated. The workman then releases the handle 102 and the spring 104 moves the latch assembly into the latched position when the pins 92 are aligned with the belt rail apertures 24. In removing the crossbar, the above-described procedure is simply reversed. It will be noted that preferably, and as illustrated, the end fittings are supported against vertically downward loads by the engagement of the foot portion 86 in groove 20 and not by the pins 92 which resist vertically upward loads and loads longitudinally of the belt rail 10. Also, it will be noted that the pins 92 and belt rail holes 24 are so proportioned that during removal, as the workman disconnects and lowers one end fitting, the pins 92 of the other end fitting will be automatically withdrawn from the belt rail apertures 24 and will not become bound up therein, nor will any movement of these pins be required or effected during such removal of the crossbar.

FIGURES 6, 7 and 8 illustrate a modified construction wrich is well adapted for use in railway boxcars and the like. The freight bracing apparatus there illustrated comprises belt rails 110 which, in the construction illustrated, are formed of a rolled steel section adapted to extend along and be suitably secured as by welding to a side wall 112. The crossbar there illustrated is generally indicated at 114 and is provided with end fittings 116 and 118 at opposite ends thereof adapted to connect the crossbar to the belt rails. In the construction illustrated in these figures the belt rail 110 includes a lower generaly channel-shaped portion having a vertically disposed web 120 adapted to extend along and be welded to a side wall 112 and having the lower leg portion 122 sloping upwardly at an angle to the web portion 120 and co-operating with an intermediate portion 124 of the belt rail to define an inwardly and upwardly facing groove 126 extending longitudinally of the belt rail. At its outer end the intermediate belt rail portion 124 is integrally connected with an apertured belt rail portion 128 extending in spaced parallel relation to the side wall 112. To provide added structural strength, the belt rail has an upper flange portion 130 extending from the vertical belt rail portion 128 to the side wall 112, to which it is welded as shown.

The crossbar 114 includes an elongated tubular aluminum body 132 and the end fittings 116 and 118 which in this modification differ from the end fittings previously described, in that they telescope over the outside of the bar body 132 rather than telescoping into it. The end fittings 116 and 118 are the same except for the differences resulting from the fact that the end fitting 116 is mounted for free telescoping movement relative to the bar body 132 between fixed limits, whereas, the end fitting 118 is fixed against movement longitudinally of the bar body. These end fittings each include upper and lower channel-shaped sheet metal sections 134 and 136 which face each other with the outer edges of the legs welded together as indicated at 138 to form a tubular body of the end fitting adapted to telescopically fit over the end portion of the tubular bar body 132. The lower channel element 136 adjacent its outer end has its web portion bent upwardly as indicated at 140 and the leg portions thereof similarly shaped to form a reduced outer end of the end fitting body which is closed by a face plate 142 extending transversely thereof and welded to the channel elements 134 and 136 as shown. The face plate 142, which is preferably formed as a forging, includes an outwardly and downwardly extending foot portion 144 having a bulbous or beaded lower end portion 146 adapted to fit into the lower portion of the groove 126 formed at the juncture of the vertical portion 120 and the upwardly inclined lower flange 122 of the belt rail. Adjacent the bead 146, the foot portion 144 has on its lower side a depression or groove 147 to facilitate hooking the foot portion over the flange 122. The foot flange 144 is reinforced by a pair of laterally spaced upwardly extending ribs 148 which connect to the vertical portion of the face plate 142. The face plate 142 is also provided with a pair of transversely spaced apertures 150 which are aligned with apertures 152 in the belt rail 110 when the foot portion 144 of the face plate is engaged in the belt rail groove 126 as shown.

A sheet metal supporting strap 154 is mounted in the end fitting body and welded to the channel elements 134 and 136 thereof and has a horizontally opening aperture 156 extending centrally therethrough, which slidably supports the shank 158 of a latch element 160 which includes a pair of laterally spaced pins 162 slidably supported in the apertures 150 of the face plate. The latch element 160 has upwardly and downwardly extending handle portions 164 and 166 adapted to be engaged by the fingers of a workman through suitable openings 168 and 170 provided in the upper and lower channel elements 134 and 146 for moving the latch element 160 from the latched position illustrated, to a retracted position in which the pins 162 are withdrawn from the belt rail apertures 152. The latch element 160 is yieldably urged toward the latched position illustrated by a coil spring 172 which encircles the shank 158 of the latch element and acts between the supporting strap 154 and the oppositely extending handle portions 164 and 166. The latch element 160 is held against movement beyond the latched position illustrated under the influence of the spring 172 by a web portion 173 extending between the pins 162 and engaging the inner surface of the face plate 142 between the apertures 150 therein. In spaced relation to its opposite ends, the bar body 132 in the bottom wall thereof carries stop elements 174 removably fastened in place and including a cylindrical stop portion 176 which, in the case of the fixed end fitting 118 at the left-hand end of FIGURE 6, is received in a circular aperture 178 formed in the web of the lower channel element 136 of the end fitting and holds the end fitting 118 against movement longitudinally of the bar body 132. In the case of the stop element 174 at the right-hand end of the bar body 132, the stop portion 176 thereof is received in an elongated slot 180 formed in the web of the lower channel element 136 of the end fitting 116, thus permitting movement of the end fitting longitudinally of the bar body 132 within the limits permitted by the length of the slot 180.

It will now be appreciated that the general operation of the modified construction illustrated in FIGURES 6, 7, and 8 is the same as the operation of the embodiment of the invention illustrated in FIGURES 1 through 5, inclusive, and need not be repeated herein, except of course, that this construction does not include means for locating the fixed end fitting 118 in a plurality of positions.

While only two specific embodiments of the invention have been illustrated and described in detail herein, it will be readily appreciated by those skilled in the art that numerous modifications and changes may be made without departing from the spirit of the present invention.

What is claimed is:

1. In a freight bracing apparatus including a crossbar body adapted to brace freight in a truck, railway boxcar or the like having a pair of opposed side walls, the combination of a belt rail adapted to be mounted on and extend along a said side wall and having a lower portion including a longitudinally and upwardly extending flange and an upper portion having a plurality of horizontally opening apertures spaced therealong, an end fitting for connecting one end of said crossbar to said belt rail and comprising an end fitting body adapted to be connected to one end of said crossbar body and having a foot portion extending transversely thereof and outwardly and downwardly therefrom, said foot portion being adapted to hook over said flange and co-operate therewith to support said end fitting on said belt rail for sliding movement therealong when said end fitting extends downwardly from said belt rail at an acute angle to said side wall, and pin means mounted on said end fitting body for movement to and from an extended position and disposed to be alignable with said apertures in said belt rail when said foot portion is hooked over said flange and said end fitting body extends generally at right angles to the side wall, said pin means when so aligned and moved to said extended position, extending into certain of said apertures.

2. The invention as defined in claim 1 including means yieldably urging said pin means toward said extended position.

3. The invention as defined in claim 2 wherein said end fitting body is elongated and has one end adapted to coaxially interfit with one end of said crossbar body and has at its other end a face plate extending generally at right angles thereto and having its lower portion extending outwardly and downwardly to comprise said foot portion.

4. The invention as defined in claim 3 including a latch assembly including said pin means and mounted in said body for sliding movement longitudinally thereof with said pin means slidably supported in said face plate.

5. The invention as defined in claim 4 wherein said latch assembly includes a pair of parallel pins constituting said pin means, a web portion extending therebetween and engaging said face plate when said pin means is in said extended position.

6. The invention as defined in claim 4 wherein said end fitting body comprises a pair of similarly facing nesting sheet metal channel elements having their web portions disposed in spaced parallel relation and their leg portions disposed in overlapping relation and welded together.

7. The invention as defined in claim 6 including an elongated sheet metal stiffener element received between the overlapping leg portions of said channel elements and having attaching flanges welded to said leg portions.

8. The invention as defined in claim 7 including a transversely extending locating pin mounted on said stiffener element and the web of the inner of said channel elements, and spring means urging said locating pin transversely of said end fitting body into a selected locating opening provided in said crossbar body.

9. The invention as defined in claim 4 wherein said foot portion of said face plate includes a generally horizontally extending portion and a lowermost generally vertically extending portion.

10. The invention as defined in claim 4 wherein said flange of said belt rail extends upwardly at an acute angle relative to said side wall and said foot portion of said face plate extends outwardly and downwardly relative to the remainder of said face plate so as to be substantially parallel to said flange of said belt rail when said end fitting is connected to said belt rail and extending at right angles to said side wall.

11. In a freight bracing apparatus including a crossbar body adapted to brace freight, the combination of a belt rail adapted to be secured to a side wall or other suitable support and which includes a lower portion having a groove opening upwardly and away from the side wall and an upper portion extending vertically and having a plurality of horizontally opening apertures spaced longitudinally thereof, an end fitting for connecting one end of said crossbar body to said belt rail, said end fitting comprising an end fitting body adapted to be connected to said crossbar body, a face plate secured to and extending transversely of said end fitting body at the outer end thereof and including a laterally offset foot portion adapted to be moved into said groove and to be moved therealong while said end fitting body extends downwardly at an acute angle relative to the side wall, said face plate being apertured above said foot portion for selective alignment with the apertures of said belt rail when said foot portion is received in said groove and said end fitting body extends substantially at right angles to said side wall, and pin means mounted on said end fitting body for movement longitudinally thereof and extending through said face plate, said pin means being movable between an extended position in which it extends into said belt rail when said face plate foot portion is received in said groove and the end fitting body extends at right angles to the side wall and a retracted position in which said pin means is withdrawn from said belt rail.

*12. In a freight bracing apparatus including a crossbar body adapted to brace freight in a truck, railway boxcar or the like having a pair of opposed side walls and including attachment means including an upwardly facing edge extending along said wall and an aperture disposed in spaced relation above said edge, an end fitting for connecting one end of said crossbar to and supporting it on said attachment means and comprising an end fitting body adapted to be connected to one end of said crossbar body and having a foot portion extending outwardly and downwardly therefrom, said foot portion being adapted to hook over said edge when said end fitting extends downwardly from said edge at an acute angle to said side wall, and pin means mounted on said end fitting body for movement to and from an extended position and disposed to be alignable with said aperture in said attachment means when said foot portion is hooked over said flange and said end fitting body extends generally at right angles to the side wall, said pin means when so aligned and moved to said extended position, extending into said aperture.*

*13. An end fitting for a crossbar for bracing freight in a truck, railway boxcar or the like, said end fitting having means at one end for connecting said end fitting to a crossbar body and having attachment means for connecting said end fitting to co-operating attachment means on a side wall or the like, said end fitting attachment means comprising pin means movable from a normal extended position in which said pin means are adapted to extend into aperture means of the cooperating attachment means to a retracted position, and foot means extending outwardly of said end fitting and having a laterally turned end portion extending away from said pin means, said foot means being adapted to hook over cooperating means of the cooperating attachment means.*

*14. An end fitting for a crossbar for bracing freight in a truck, railway boxcar or the like, said end fitting having means at one end for connecting said end fitting to a crossbar body and having attachment means for connecting said end fitting to co-operating attachment means on a side wall or the like, said end fitting attachment means comprising at least one pin extending longitudinally of said end fitting and mounted thereon for longitudinal movement from a normal extended position in which said pin extends into aperture means of the cooperating attachment means to a retracted position, and a foot portion disposed at the other end of said end fitting and extending longitudinally of said end fitting, said foot portion having an end portion extending transversely of said end fitting away from said pin, said foot portion being adapted to hook over cooperating means of the cooperating attachment means.*

*15. An end fitting for a crossbar for bracing freight in a truck, railway boxcar or the like, said end fitting having means at one end for connecting said end fitting to a crossbar body and having attachment means for connecting said end fitting to co-operating attachment means on a side wall or the like, said end fitting attachment means comprising pin means movable between a normal extended position in which said pin means is adapted to extend into aperture means of the cooperating attachment means and a retracted position, and foot means extending outwardly of said end fitting and having a laterally turned end portion extending in a direction away from said pin means, said foot means being adapted to hook over cooperating means of the cooperating attachment means, said foot means including a portion spaced transversely of said end fitting at a right angle to said direction and adapted to hook over the cooperating means of the cooperating attachment means.*

*16. An end fitting for a crossbar for bracing freight in a truck, railway boxcar or the like, said end fitting having means at one end for connecting said end fitting to a crossbar body and having attachment means for connecting said end fitting to co-operating attachment means on a side wall* or the like, said end fitting attachment means comprising interconnected spaced parallel pins movable longitudinally *to and from a normal extended position in which said pins are adapted to extend into aperture means of the cooperating attachment means, and foot means extending outwardly of said end fitting and having a laterally turned end portion extending away from said pins, said foot means being adapted to hook over cooperating means of the cooperating attachment means.*

*17. An end fitting for a crossbar for bracing freight in a truck, railway boxcar or the like, said end fitting having means at one end for connecting said end fitting to a crossbar body and having attachment means for connecting said end fitting to co-operating attachment means on a side wall or the like, said end fitting attachment means compris-*

*ing a plate extending transversely of said end fitting at the opposite end thereof, at least one pin extending longitudinally of said end fitting and mounted for longitudinal movement to and from a normal extended position in which said pin extends outwardly from said opposite end and is adapted to extend into aperture means of the cooperating attachment means, and a foot portion extending outwardly of said opposite end and terminating in a laterally turned end portion extending transversely of said end fitting away from said pin.*

References Cited

The following references, cited by the Examiner, are of record in the patented file of this patent or the original patent.

UNITED STATES PATENTS

| | | | |
|---|---|---|---|
| 2,425,875 | 8/1947 | Hermann | 105—369 |
| 2,576,425 | 11/1951 | Thearle | 105—369 |
| 2,659,319 | 11/1953 | Herman. | |
| 3,071,086 | 1/1963 | Dunlap | 105—369 |
| 3,090,329 | 5/1963 | Rolfe. | |
| 3,115,102 | 12/1963 | Rolfe et al. | |
| 3,130,690 | 4/1964 | Johnston | 105—369 |
| 3,165,075 | 1/1965 | Miller | 105—369 |

ARTHUR L. LA POINT, *Primary Examiner.*

DRAYTON E. HOFFMAN, *Examiner.*